United States Patent
Kalkwaf

[11] 3,742,687
[45] July 3, 1973

[54] PICKUP ATTACHMENT FOR CORN HARVESTERS

[76] Inventor: Lester Kalkwarf, R.F.D. No. 2, Aurora, Nebr. 68818

[22] Filed: Apr. 28, 1972

[21] Appl. No.: 248,449

[52] U.S. Cl. .................................. 56/119, 56/106
[51] Int. Cl. ........................................... A01d 45/02
[58] Field of Search ................... 56/119, 105, 106, 56/317

[56] References Cited
UNITED STATES PATENTS

| | | | |
|---|---|---|---|
| 3,438,184 | 4/1969 | Jellis | 56/317 |
| 2,963,843 | 12/1960 | Deal | 56/119 |
| 3,646,737 | 3/1972 | Grant | 56/106 |
| 1,175,743 | 3/1916 | From | 56/106 |
| 3,585,790 | 6/1971 | Kalkwarf | 56/119 |

Primary Examiner—Antonio F. Guida
Attorney—Harvey B. Jacobson

[57] ABSTRACT

A rotary tine construction for upwardly and rearwardly displacing down cornstalk portions passing between the forward ends of the forwardly projecting horizontally transversely adjustable split snout arms or side wall portions of a multiple row corn head constructed in accordance with U.S. Pat. No. 3,585,790.

5 Claims, 4 Drawing Figures

PATENTED JUL 3 1973

PICKUP ATTACHMENT FOR CORN HARVESTERS

The split and adjustable snout construction disclosed in U. S. Pat. No. 3,585,790 is provided to enable down cornstalks to be lifted from the ground in an efficient manner without the forward lower portions of the divider elements being positioned closely adjacent the ground and thereby promotes more efficient pickup of down cornstalks without the forward ends of the snouts of a corn head being lowered into such close proximity to the ground that they intermittently engage the ground. However, when utilizing a split snout construction such as that disclosed in the aforementioned patent there is a tendency for the debris that may pile up in times when the snouts are moving through material that is badly tangled. Accordingly, the pickup attachment of the instant invention has been designed to provide a supplemental means whereby the lifting of down stalks and ears from between the adjustable forwardly projecting arms of the aforementioned split snout construction may be supplemented. In addition, the aforementioned debris that may pile up when going through badly tangled material is engaged by the tines or fingers of the pickup attachment and therefore kept in motion to prevent excessive pile up of debris.

The problem of lifting down stalks without lowering the divider snouts of multiple row corn heads has long been realized, especially when cornstalks are infected with stalk rot and blight. If a conventional corn head is lowered sufficiently to pick up a large portion of the down stalks rocks and other hard objects may also be picked up and the accumulation of leaves and other debris on the points of the snouts occurs with these accumulations intermittently being released from the snout points to be picked up by the corn head causing damage to the cylinder and concaves.

Accordingly, the main object of this invention is to provide a pickup attachment for utilization in conjunction with split adjustable snout constructions such as that disclosed in the aforementioned patent and which will function to facilitate the lifting of additional down cornstalks even when the snout portions of the corn head are at their proper elevation relative to the ground so as to pass over ground debris.

Another object of this invention, in accordance with the immediately preceding object, is to provide a pickup attachment which may be readily mounted upon existing split adjustable snout constructions and driven from the drive train of the corn head in an efficient manner.

Yet another object of this invention is to provide a rotary pickup attachment in accordance with the preceding objects and which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
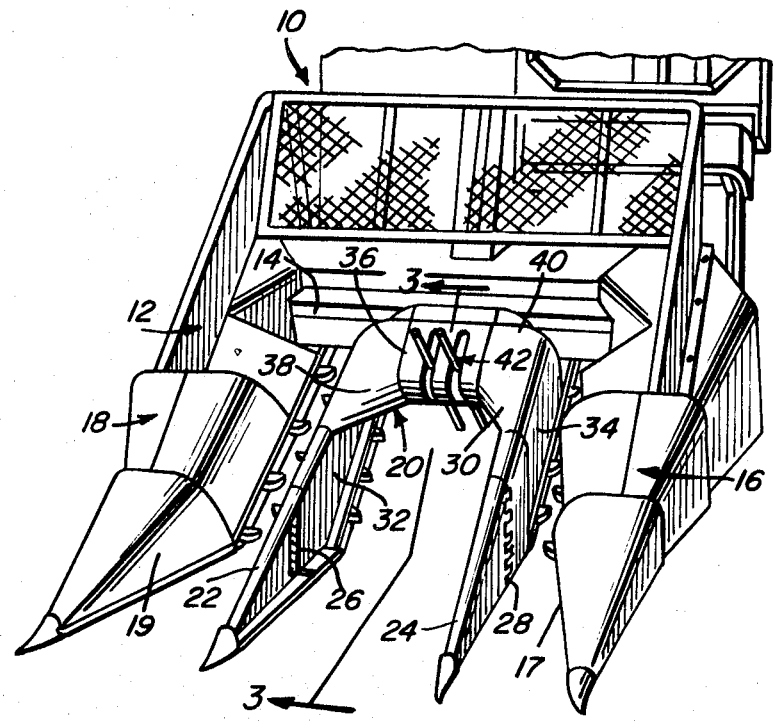
FIG. 1 is a perspective view of the front portion of a conventional form of corn harvester provided with the split adjustable snout construction disclosed in the aforementioned patent and with the pickup attachment of the instant invention incorporated therein.
Figure 2:
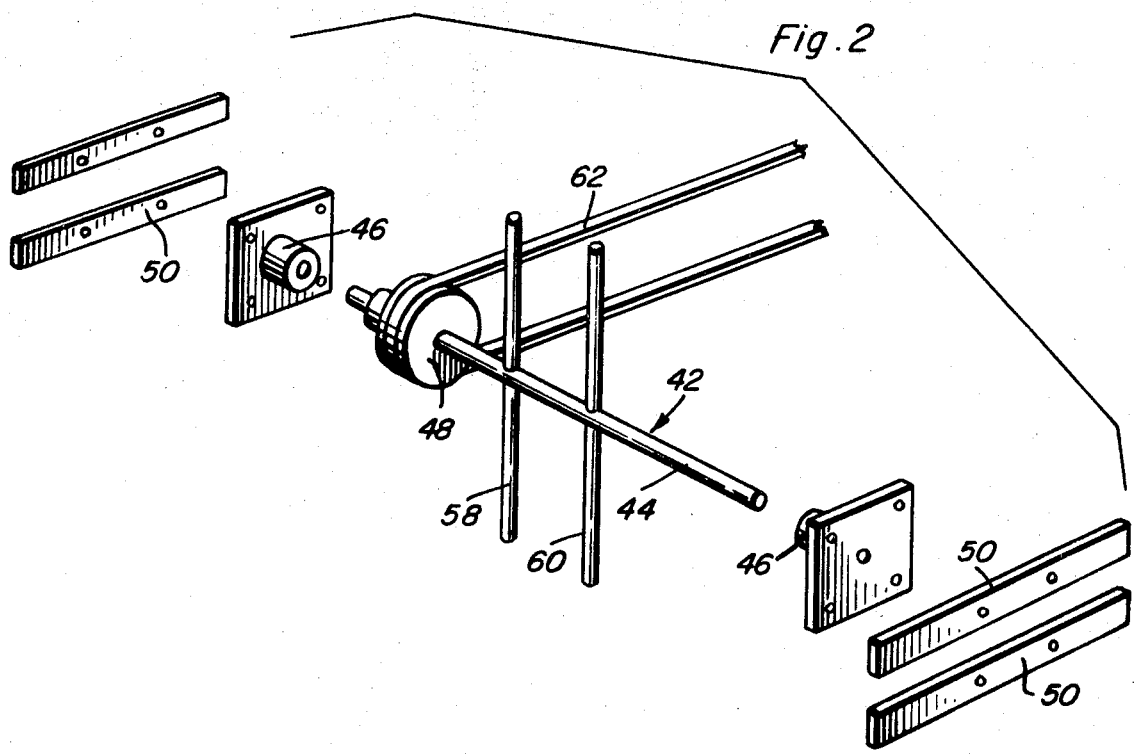
FIG. 2 is an enlarged exploded perspective view of the pickup attachment.

Referring now more specifically to the drawings the numeral 10 generally designates a combine including a two row head referred to in general by the referance numeral 12. The head 12 includes a transverse frame 14 and a pair of opposite side divider assemblies or snouts referred to in general by the reference numerals 16 and 18 and including forwardly convergent inner and outer side walls 17 and 19, respectively. The head 12 further includes a center snout referred to in general by the reference numeral 20 including opposite side forwardly projecting and tapering arms or side walls 22 and 24 which are pivotally supported as at 26 and 28 for adjustable angular displacement about upstanding axes. The specific structure and operation of the center snout 20 is clearly set forth in U. S. Pat. No. 3,585,790.

The rearward portion 30 of the snout 20 includes opposite side walls 32 and 34 and an upper generally horizontally disposed semi-cylindrical shroud 36 extends between the inwardly directed upper marginal portions 38 and 40 of the side walls 32 and 34.

The pickup attachment of the instant invention is referred to in general by the reference numeral 42 and includs a transverse shaft 44 journalled by means of opposite end journal blocks 46 and having a pulley wheel 48 mounted thereon intermediate the journal blocks 46.

Pairs of mounting bars 50 are secured to the inner surfaces of the side walls 32 and 34 in any convenient manner and the journal blocks 46 are removably secured to the mounting bars 50 by means of fasteners 52. Accordingly, the opposite ends of the shaft 44 are journalled and supported from the side walls 32 and 34.

The shroud 36 has a pair of slots 54 and 56 formed therein and the shaft includes axially spaced pairs of diametrically opposite and radially outwardly projecting tines 58 and 60 whose outer ends project through the slots 54 and 56, respectively, and are swingable therethrough upon rotation of the shaft 44.

An endless flexible drive member in the form of a V-belt 62 is trained about the pulley 48 and the belt 62 may be driven from the drive train (not shown) of the corn head 12 in any convenient manner.

The tines 60 are generally cylindrical in configuration and although only two pairs of diametrically opposite and radially outwardly projecting tines are mounted on the shfat 44, additional axially spaced sets of tines and appropriate slots in the shroud 36 may be provided if desired. In addition, each set of tines 58 or 60 may include more than two tines, although the tines of each set of tines will be spaced equally circumferentially about the shaft 44.

Figure 3:
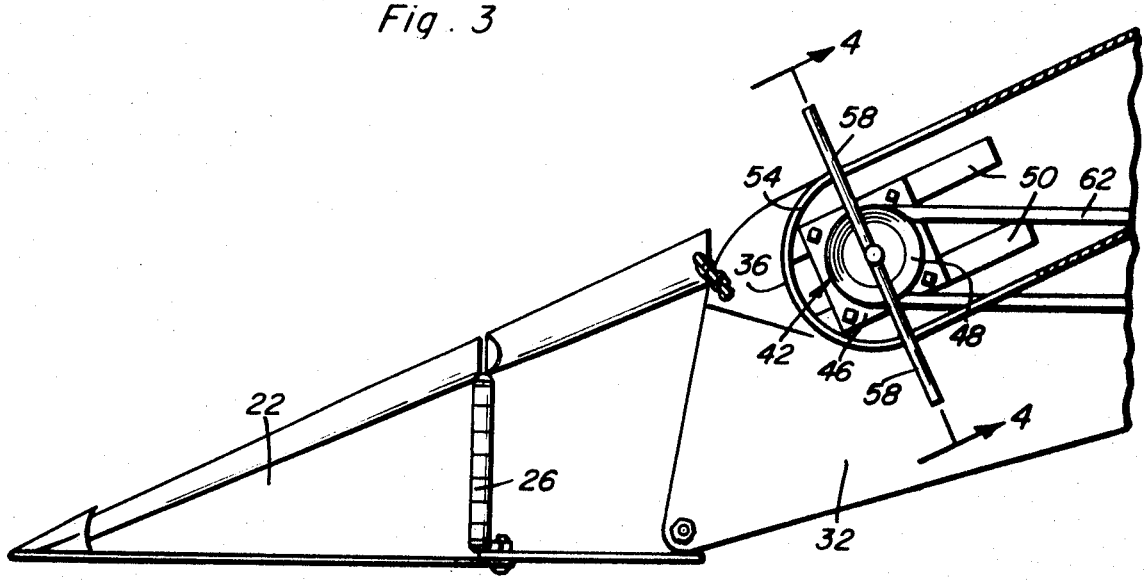
FIG. 3 is an enlarged longitudinal vertical sectional view taken substantially upon the plane indicated by the section line 3—3 of FIG. 1.
Figure 4:
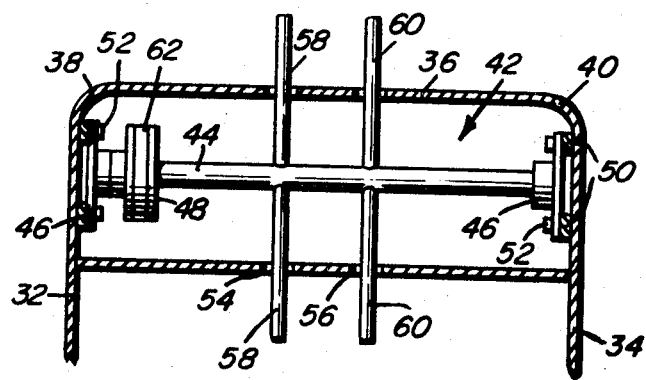
FIG. 4 is a transverse sectional view taken substantially upon the plane indicated by the section line 4—4 of FIG. 3.

In operation, the shaft 44 is rotated in a clockwise direction as viewed in FIG. 3 of the drawing whereupon any stalks down between the arms 22 and 24 may be engaged by the tines 58 and 60 and elevated to the upper surfaces of the rear portion of the snout 20 for subsequent passage between the snout 20 and the snouts 16 and 18.

In addition to serving the purpose of facilitating and lifting down cornstalks, the tines 58 and 60 are also engageable with debris passing rearwardly between the arms 22 and 24 and entangled with the down stalks and the lifting action upon the debris entangled with the stalks will also serve to facilitate the lifting of the stalks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a harvester of the type including a plurality of laterally spaced pairs of forwardly tapering snout constructions between each pair of which snout constructions row crops to be harvested are receivable, each snout constuction intermediate the opposite side snout constructions being split and including a pair of forwardly projecting laterally spaced side walls interconnected at their rear end portions by means of an upper horizontal transverse portion extending therebetween, said side walls each including a forwardly projecting and tapering arm pivotally supported at its rear end portion from the forward end portion of the corresponding side wall for adjustable angular displacement about an upstanding axis, said upper horizontal transverse including a pickup attachment comprising a horizontal transverse shaft journalled between the upper rear end portions of said side walls and including circumferentially and axially spaced generally radially outwardly projecting pickup tines mounted on the shaft for rotation therewith, and drive means operatively associated with the shaft for driving the latter in a direction of rotation so as to swing the forwardly projecting tines of the shaft in an upward direction.

2. The combination of claim 1 wherein said transverse portion comprises upper shroud construction extending between the upper rear ends of said side walls, said shroud construction including vertically extending forwardly opening slots through which the free ends of said tines are swingable.

3. The combination of claim 1 including mounting means carried by the inner surfaces of said side walls, journal blocks, means securing said journal blocks to said mounting means, the opposite ends of said shaft being journalled from said journal blocks.

4. The combination of claim 1 wherein said tines are arranged on said shaft in axially spaced pairs of diametrically opposite and radially outwardly projecting tines.

5. The combination of claim 2 wherein said shroud construction comprises a forwardly convex transversely extending generally semi-cylindrical wall portion, the axis of rotation of said shaft generally coinciding with the axis of curvature of said semi-cylindrical wall portion.

* * * * *